(No Model.)
G. W. DOOLITTLE.
CULTIVATOR OR PLOW.
No. 415,308. Patented Nov. 19, 1889.
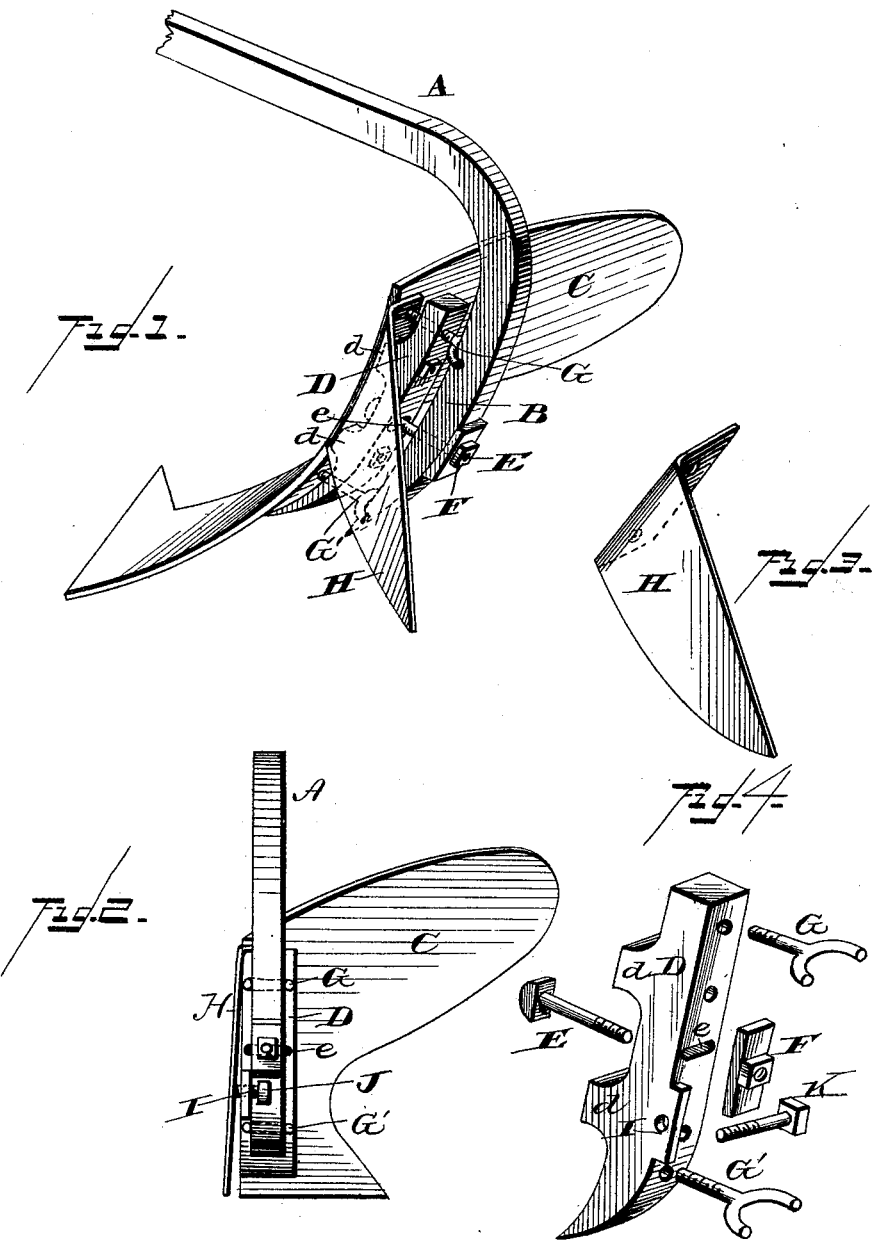
WITNESSES
F. L. Ourand
O. E. Dayly
INVENTOR
Geo. W. Doolittle
By J. C. Higdon
his Attorney.

UNITED STATES PATENT OFFICE.

GEORGE W. DOOLITTLE, OF KANSAS CITY, MISSOURI, ASSIGNOR OF ONE-HALF TO LEONARD A. SIMMONS, OF SAME PLACE.

CULTIVATOR OR PLOW.

SPECIFICATION forming part of Letters Patent No. 415,308, dated November 19, 1889.

Application filed June 11, 1889. Serial No. 313,881. (No model.)

*To all whom it may concern:*

Be it known that I, GEORGE W. DOOLITTLE, of Kansas City, Jackson county, Missouri, have invented certain new and useful Improvements in Cultivators or Plows, of which the following is a full, clear, and exact description, reference being had to the accompanying drawings, forming a part hereof.

My invention relates to improvements in cultivators, having for its object to provide means whereby the lateral draft caused by the mold-board is counterbalanced or neutralized, thereby relieving the operator of the strain necessary to cause the cultivator to travel in a straight line. The rearward pressure of the soil on the mold-board has a tendency to swing the front end of the plow outward or from the landside and throw it out of the furrow, and therefore there is a continual strain on the operator, and it requires great exertion to hold the plow in the furrow.

I attain my object in the device consisting in a certain novel construction and combination of parts, as fully described hereinafter in connection with the accompanying drawings, wherein—

Figure 1 is a perspective view of a plowshare and mold-board provided with my improvements and applied in the operative position to the knee or standard of a cultivator. Fig. 2 is a rear view of the same. Fig. 3 is a detail view of the adjustable wing; and Fig. 4 is a similar view of the block to which the mold-board is directly connected, showing its adjusting devices detached.

Referring by letter to the drawings, A represents the rear portion of a plow or cultivator beam, which is turned down at its extremity to form the knee or standard B, and C represents the mold-board, of the ordinary or any preferred form, which is connected to said knee or standard, said mold-board being bolted to a block D, which is firmly secured to the knee. The block D is provided on its front side with the bosses or projections $d\, d$, against which the mold-board bears and to which the same is bolted, as seen at $d'$, and a through-bolt E extends through registering openings in the center of the block and in the knee and is engaged in rear of the latter by a nut F. The aperture in the block, through which the bolt E extends, is elongated transversely to form a slot $e$, whereby the block may be adjusted laterally independently of the bolt. This block is also provided, respectively near its upper and lower ends, with adjusting-bolts G G', the rear ends of which are provided with forks $g\, g'$ to engage the front side of the knee. To adjust the inclination of the block D, therefore, the adjusting-bolts G G' are screwed, respectively, in and out, and they are firmly locked in the adjusted position by the forks on their rear ends.

H represents the counterbalancing-wing, which is secured at its upper end to the inner or landside edge of the mold-board or to any other stationary part of the cultivator on the opposite side from the free end of the mold-board and its lower end or apex (the said wing being preferably tapered or reduced toward its lower end, as shown) is in the plane of the lower edge of the mold-board. The front rounded edge of the wing is sharpened to cut the soil on the landside of the cultivator. The upper edge only of the wing is rigidly secured to the cultivator, the lower end being free to be arranged close to or remote from the knee, and in a flange I on the rear side of the block D is mounted an adjusting-screw K, which bears at its end against the inner surface of the wing, near its lower end, to enable it to be adjusted at the proper inclination. The lower end of the counterbalancing-wing, as will be understood, cuts into the soil on the landside of the cultivator, thereby slightly impeding or checking this side, and thereby counterbalancing the effect of the pressure on the mold-board, and the amount of resistance offered by the said wing is governed by the angle at which it is arranged, and this is regulated by the adjusting-screw K. Thus if the cultivator has a tendency to swing outward or from the landside the lower end of the wing must be adjusted from the knee, and obviously if the cultivator swings in the opposite direction or inward the lower end of the wing must be adjusted toward the knee. The wing is arranged in an approximately vertical position and will assume a vertical position if the adjusting-screw is drawn back sufficiently in this position corresponding in effect to the ordinary landside; but in this position the wing exerts no rearward pressure on the cultivator, and therefore does not counterbalance the effect of the mold-board; but if the wing is arranged at a slight inclination, sufficient to throw it out of the plane of the edge of the mold-board or the landside edge of the plowshare, the effect of the soil on the mold-board is to a certain extent counterbalanced.

The advantage of the herein-described adjusting means for the block D is, that the mold-board and wing may be arranged at any desired angle without reference to the inclination of the knee. Thus if the knee is vertical, or nearly so, the block may be adjusted at the desired angle by screwing the upper adjusting-bolt in and the lower bolt out, the through-bolt, which is located at the center of the block, not being affected by the adjustment of the adjusting-bolts.

Having thus described my invention, what I claim, and desire to secure by Letters Patent of the United States, is—

1. An approximately vertical counterbalancing cutting-wing affixed at its upper end to the land-side side of a cultivator and having its lower end in the plane of the lower edge of the mold-board, and adjusting means whereby the said wing may be arranged at any desired inclination, substantially as specified.

2. In a cultivator, the combination, with the knee, of a block carrying the mold-board and provided at its upper and lower ends with adjusting-bolts having forked rear ends to engage the knee, and a lateral slot and securing-bolt, as described, whereby the block may be arranged at any desired inclination, substantially as specified.

3. In a cultivator, the combination, with the knee, of an adjustable block provided with a central transverse slot and having bosses or projections above and below said slot, the mold-board bearing against said bosses or projections and bolted thereto, the securing-bolt arranged in the knee and said transverse slot, and the adjusting-bolts engaging the upper and lower ends of the blocks and bearing at their free ends against the knee, substantially as specified.

4. In a cultivator, the combination, with an adjustable block carrying the mold-board and provided with an ear I, and the adjusting and securing bolts engaging said block, of the wing secured at its upper edge to the mold-board, and the adjusting-screw K, mounted in the ear I and engaging the free end of the wing, substantially as specified.

In testimony whereof I affix my signature in presence of two witnesses.

GEORGE W. DOOLITTLE.

Witnesses:
F. G. FISCHER,
A. A. HIGDON.